United States Patent
Robbins et al.

[11] Patent Number: 6,022,064
[45] Date of Patent: Feb. 8, 2000

[54] PARTITIONED CABLE SLEEVE FOR AUTOMOBILE CONVERTIBLE TOPS

[75] Inventors: Douglas W. Robbins, Malibu; Roy P. Agosta, Reseda, both of Calif.

[73] Assignee: Robbins Auto Top Company, Inc., Santa Monica, Calif.

[21] Appl. No.: 09/108,121

[22] Filed: Jun. 30, 1998

Related U.S. Application Data

[60] Provisional application No. 60/051,279, Jun. 30, 1997.

[51] Int. Cl.[7] .................................................. B60J 7/00
[52] U.S. Cl. ...................................................... 296/107.12
[58] Field of Search ...................... 296/107.04, 107.05, 296/107.12, 100.15, 135; 135/907

[56] References Cited

U.S. PATENT DOCUMENTS

| | | | |
|---|---|---|---|
| 1,759,250 | 5/1930 | Wright | 296/107.12 |
| 2,482,323 | 9/1949 | Cromwell et al. | 296/107.12 |
| 2,649,330 | 8/1953 | Schamel et al. | 296/107.04 X |
| 2,752,192 | 6/1956 | Dotty et al. | 296/107.04 X |
| 3,167,349 | 1/1965 | Young et al. | 296/107.05 X |

*Primary Examiner*—D. Glenn Dayoan
*Assistant Examiner*—Chad D Wells
*Attorney, Agent, or Firm*—Kelly Bauersfeld Lowry & Kelley, LLP

[57] ABSTRACT

In automobile convertible tops using a tension cable to stretch the soft top and force the sides of the soft top close to the convertible top frame and weather seal, an improved cable sleeve is provided, wherein the cable sleeve is partitioned to form a narrower channel so as to further limit the movement of the sleeve and the soft top in relation to the tension cable to keep the lower side edges of the soft top downward against the soft top frame to create a better seal, and at the same time enhance the shape of the soft top by keeping it fully stretched and reducing shrinkage and upward movement of the soft top. In addition, by adding an intermediate layer of material to bond the cable sleeve to the soft top, direct stitching of the cable sleeve to the soft top will be avoided, thereby preventing water leakage through the stitching holes and enhancing the appearance of the soft top.

6 Claims, 3 Drawing Sheets

PARTITIONED CABLE SLEEVE FOR AUTOMOBILE CONVERTIBLE TOPS

This application claims benefit of Provisional Application 60/051,279 filed Jun. 30, 1997.

BACKGROUND OF THE INVENTION

This invention generally relates to automobile convertible tops, and particularly to convertible tops that utilize a tension cable to hold the top down for a tight fit against the convertible top frame and other components such as side weather seals and side windows.

Many automobile manufacturers offer models with convertible or soft tops that are very popular with consumers as they provide the option and flexibility to drive with the top raised in the covered position or with the top down in the uncovered position to enhance the driving enjoyment. However, one of the drawbacks associated with soft tops is that when they are in the raised position, they do not provide as quiet a passenger compartment as compared to automobiles with hard tops. This noise problem is partly due to the fact that the soft material used for convertible tops, typically a form of cloth material, generally does not have good sound blocking characteristics. Another reason for the increased passenger compartment noise in convertible automobiles is the fact that the lower edges of the soft top does not form a tight seal against other structural components such as the frame of the soft top and the side door windows, thereby resulting in a source of air leakage and increased wind noise inside the passenger compartment.

For many years, manufacturers of convertible tops have incorporated side tension cables in the design of convertible soft top systems, wherein at each lower side edge of the soft top a cable is attached at its two ends to the collapsible frame mechanism of the soft top above the weather seals that rest adjacent the side door windows when the doors are closed and the side windows are rolled up. In these existing convertible top systems, the tension cable is housed in a sleeve created by a single piece or two spaced apart patches of soft material that attach to the interior surface of the main soft top to create a pocket or channel for the cable to run through. In this manner, upon raising the convertible top and latching it shut, the cable is stretched and placed in tension, and with the cable inside the channel formed in the cable sleeve, the goal is to utilize the cable as a means to force the lower side edges of the soft top to remain at a downward position against the frame of the soft top and the weather seals over the upper edges of the side door windows to create a better seal and a shingling or overlapping effect.

However, these existing designs have not been without problems. For example, due to the relatively large width of the channel opening in the cable sleeve, the cable sleeve often floats and moves up around the tension cable, thus causing the soft top to also move up and create a gap between the lower edge of the soft top and the weather seal, which greatly contributes to increased air leakage and wind noise. In addition, in such existing designs, the soft top tends to slide and shrink upward until the lower edge of the cable sleeve rests against the tension cable, which is itself positioned higher than the upper edges of the side door window. This problem essentially interferes with and reduces the desirable shingling or overlapping effect described above, as it makes it very difficult to have a good tight seal between the lower side edges of the soft top and the weather seal and the side door window, which creates problems with wind noise and also creates a gap to allow leakage of water inside the automobile.

Another problem with existing convertible tops is that the patch(es) or strip(s) of material forming the cable sleeve is typically connected to the soft top by means of stitching the sleeve patch(es) or strip(s) directly to the soft top. The penetration of the stitching through the soft top creates tiny holes that are unsightly and also are a potential source for leakage of water and transfer of moisture from the outside surface of the soft top to the inside.

The present invention addresses the above-mentioned problems and shortcomings by providing an improved partitioned cable sleeve that limits the movement of the sleeve and the soft top in relation to the tension cable in a narrower channel which has its lowest boundary that is positioned closer to the tension cable. This improved design uses the stationary tension cable to keep the lower side edges of the soft top further down and closer to the soft top frame to form a better seal and create a better shingling effect over the other structural members of the automobile such as the weather seal and the side door window that rests against the weather seal. The improved design of the invention also enhances the shape of the soft top by keeping it fully stretched and reducing its shrinkage and upward movement. Furthermore, the present invention utilizes an intermediate material that can bond the cable sleeve to the interior of the soft top by use of various bonding methods, thereby eliminating the holes created by the direct stitching of the cable sleeve to the soft top.

SUMMARY OF THE INVENTION

In accordance with the invention, in an automobile with a convertible soft top attached to a collapsible frame, an improved partitioned cable sleeve is provided to maintain the tension cable which runs through the cable sleeve in a narrower channel, thereby forcing the cable to hold the lower edge of the convertible soft top further downward against the soft top frame and the weather seal that is attached to the soft top frame and creating a shingling effect in relation to the weather seal and side door window.

In typical convertible automobiles, the soft top is attached by conventional methods to a collapsible frame, which allows the top to be raised up to cover the passenger compartment or lowered and retracted to expose the passenger compartment to open air. Also, a weather seal that is typically made of a strip of rubber material is connected to and runs along the lower side edges of the soft top frame so as to close any gaps between the soft top frame and the side door windows in their rolled up position. By connecting two patches or strips of material along their lengths at their upper and lower ends so as to leave a gap or pocket between them and securing the two strips to the interior side edges of the soft top, a sleeve or channel is created to allow a cable to run therethrough substantially parallel to the lower side edges of the soft top frame above the side door windows. Alternatively, the cable sleeve can be formed by securing a single patch or strip of material at its upper and lower ends to the interior of the soft top, leaving a channel between the single patch and the soft top material. In either form, a binding strip or other similar material is placed around the lower edge of the soft top and the sleeve material to secure their ends together and prevent them from coming apart. The length of the cable running through the cable sleeve is selected so that when it is connected at its two ends to the frame of the soft top and the top is raised up and latched shut, the cable is placed in tension.

The present invention improves existing cable sleeve designs by narrowing the cable sleeve channel around the tension cable and raising the lower edge of the cable sleeve channel to a location adjacent the tension cable. This is done by adding an intermediate connection point between the upper and lower edges of the strips of material that form the cable sleeve, or in the case of cable sleeves formed of a single strip of material, an intermediate connection point between the upper and lower edges of the single strip and the soft top is added. In either case, the cable sleeve channel is reduced and the lowest edge or boundary of the channel is raised higher and closer to the resting position of the tension cable.

With this construction, when the soft top is raised and the cable is placed in tension, the upward movement of the cable sleeve and the soft top secured to the cable sleeve is limited by the contact between the lowest point of the cable sleeve channel and the tension cable, and since the lowest point of the cable sleeve channel is higher than conventional cable sleeve designs, the edge of the soft top is kept further down and closer to the soft top frame and the weather seal as compared to conventional existing designs. This elimination of the gap between the lower edge of the soft top and the soft top frame also improves the desirable shingling effect of the top over the weather seal and the side door windows, and also stretches the soft top to reduce shrinkage and enhance its appearance.

Furthermore, instead of directly stitching the cable sleeve material to the interior of the soft top as is done in existing designs, the invention utilizes an intermediate layer of material that can bond the cable sleeve material and the soft top, thus avoiding the holes created by stitching of the cable sleeve directly to the soft top, which is both unsightly and a source of water leakage.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
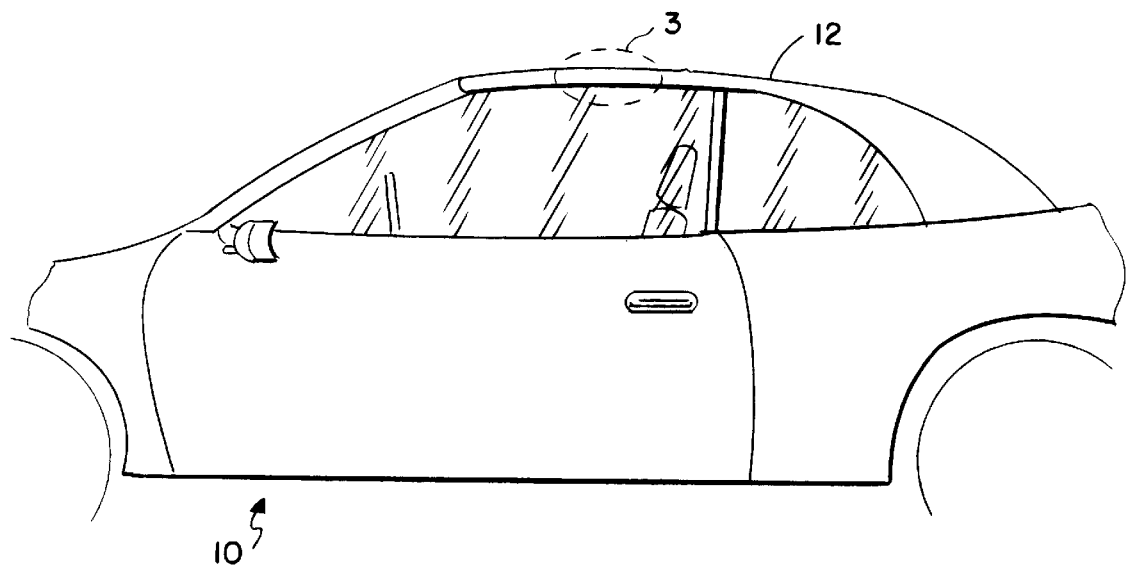
FIG. 1 is a side elevational view of an typical automobile with a convertible soft top employing a tension cable and a cable sleeve.
Figure 2:
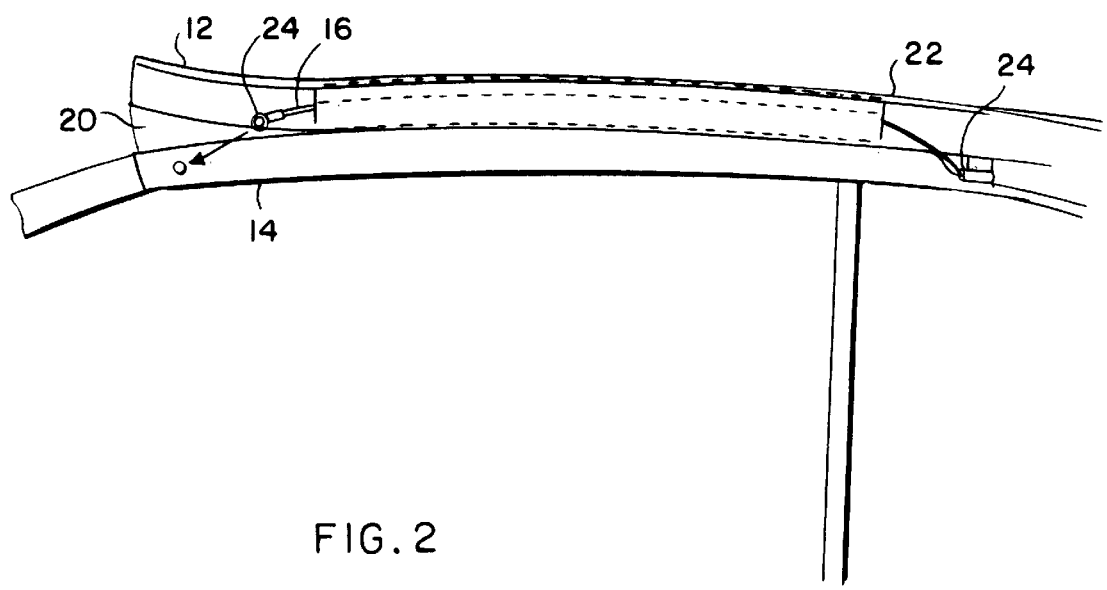
FIG. 2 is an enlarged side elevational view similar to FIG. 1, showing a tension cable and a cable sleeve embodying the present invention, with the lower edge of the soft top raised to expose the cable sleeve and show the connection of the tension cable to the soft top frame.

As shown in the exemplary drawings, in an automobile referred to generally by the reference numeral 10 with a convertible soft top 12 that is attached to a convertible top frame 14 as known by those skilled in the art, in accordance with the existing prior art, a cable 16 is positioned through a cable sleeve 18 located along the interior surface 20 of the lower side edges 22 of the soft top 12, and the cable 16 is secured and fixed at its two ends 24 by known methods (e.g., screws, rivets, etc.) to the convertible top frame 14 so that it runs substantially parallel to the lower side edge 22 of the soft top along the length of the automobile. The prior art cable sleeve 18 is typically formed by stitching two long strips or patches 30 of material substantially along their upper edge 26 and lower edge 28 to the interior surface 20 of the soft top 12 along the lower side edges 22 of the soft top such that an open channel 32 is formed between the two strips 30. Alternatively, the prior art cable sleeve 18 can be formed by using a single strip 30 of material that is stitched to the interior surface 20 of the soft top 12 to form the open channel between the single strip of material and the interior surface of the soft top (this alternative is not shown in the drawings). The material used for the strip(s) 30 forming the cable sleeve can be PVC coated cloth or laminated acrylic cloth, similar to the material used for the soft top, or any other suitable material. A binding strip 34 is placed around the lower side edge 22 of the soft top 12 and the lower edge 28 of the strip(s) forming the cable sleeve to secure their ends together and prevent them from coming apart.

Figure 5:
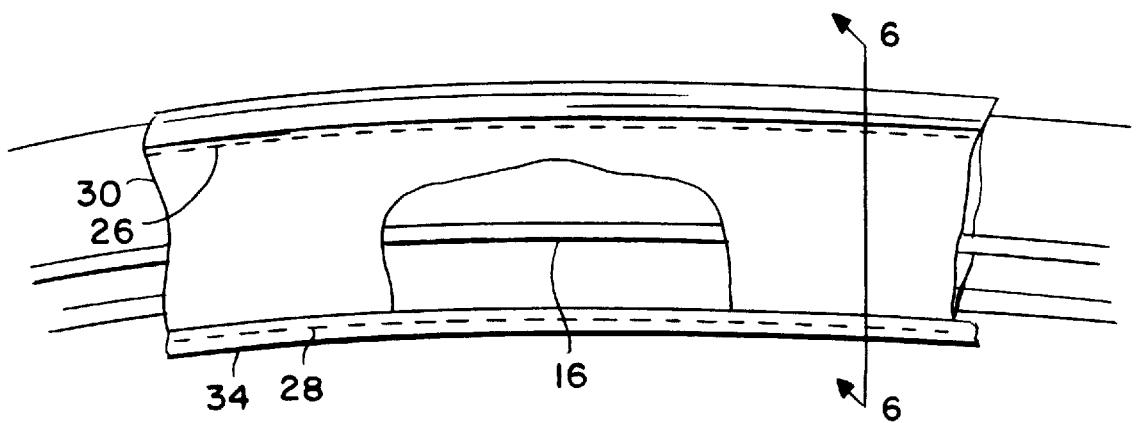
FIG. 5 is an enlarged view of the area designated by reference numeral 3 in FIG. 1, showing a prior art cable sleeve.
Figure 6:
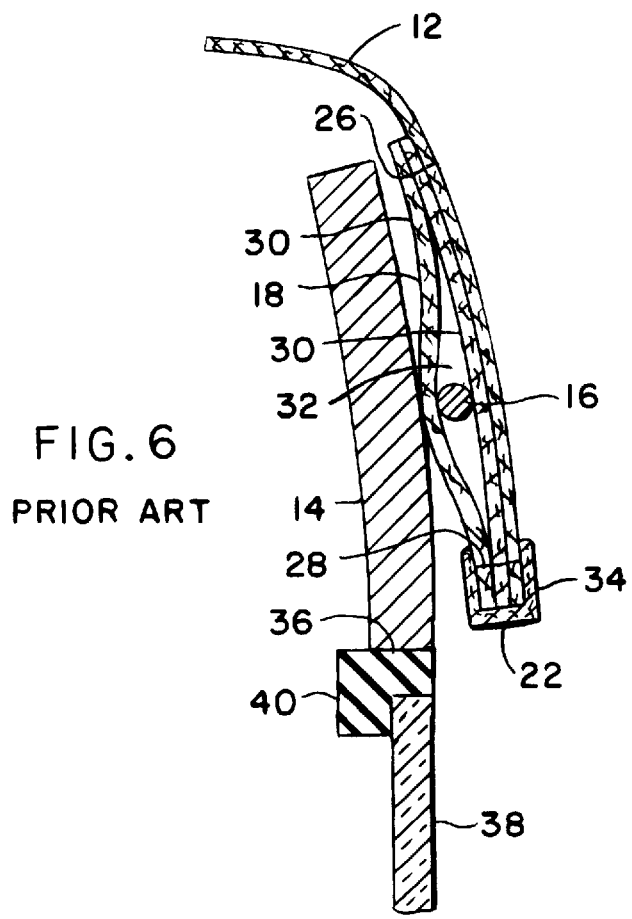
FIG. 6 is a cross-sectional view taken along line 6—6 of FIG. 5, showing a prior art cable sleeve.

Accordingly, in prior art existing cable sleeves illustrated in FIGS. 5 and 6, when the convertible soft top is raised and latched shut, the cable 16 is placed in tension and is fixed in its position just above the lower side edge 36 of the soft top frame 14 above the automobile's side door window 38 (it is understood that a cable sleeve and a tension cable is located at each of the left and right sides of the automobile). Since the tension cable 16 extends through the channel 32 formed in the cable sleeve 18, the lower side edge 22 of the soft top 12 which naturally tends to move upward and outward away from the lower side edge 36 of the soft top frame 14 is to some extent held down. However, since the cable sleeve channel 32 in existing soft top designs has an opening that is too large and extends substantially from near the lower side edge 22 of the soft top (where the binding strip is located) to near the upper edge 26 of the cable sleeve, the upward movement of the soft top is not limited to the extent necessary, and as a result, an undesirable gap is formed between the lower side edge 22 of the soft top and the soft top frame 14. For the same reason, in existing designs, the lower side edge 22 of the soft top does not rest sufficiently close enough against a weather seal strip 40 that typically is located on the left and right sides of the automobile and attached to the lower side edge 36 of the soft top frame, which is intended to act as a seal against the upper edge 42 of the side door window.

Figure 3:
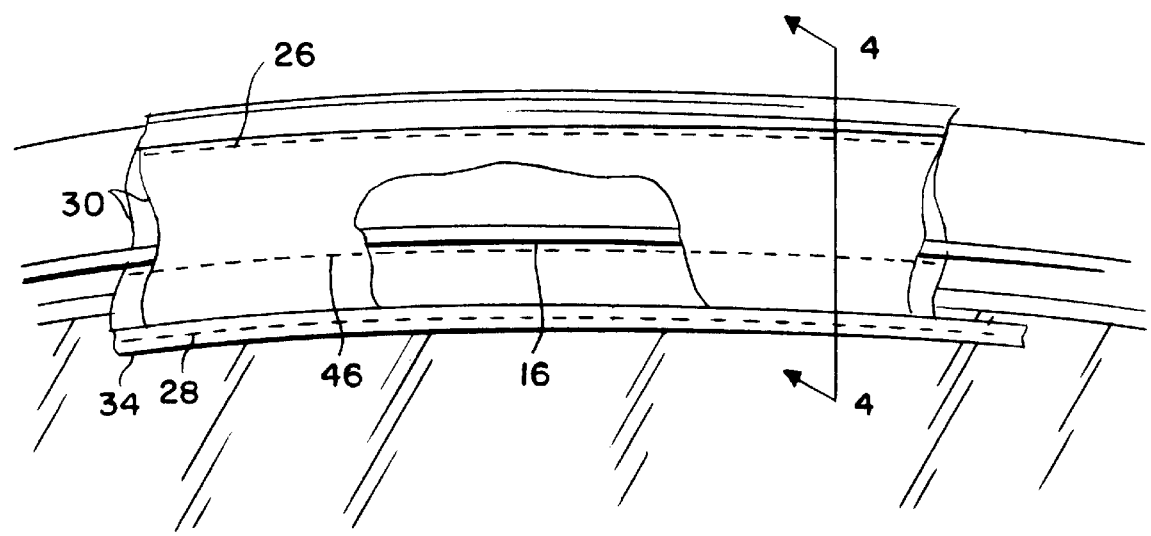
FIG. 3 is an enlarged view of the area designated by reference numeral 3 in FIG. 1, showing a cable sleeve embodying the present invention.
Figure 4:
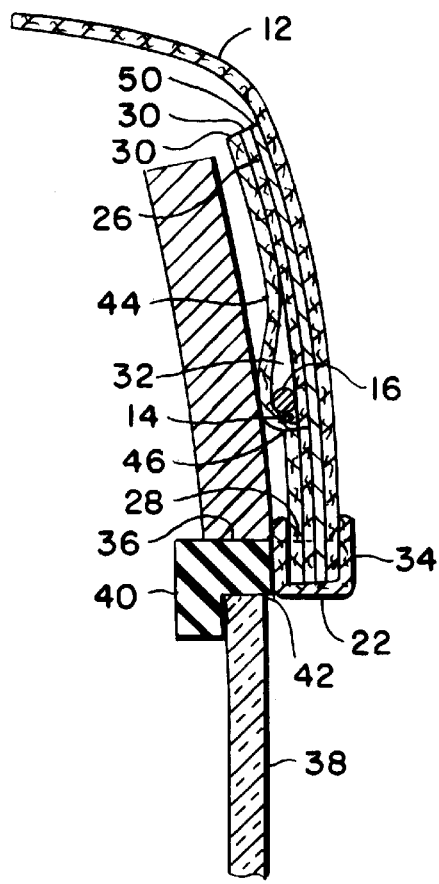
FIG. 4 is a cross-sectional view taken along line 4—4 of FIG. 3.

To correct this drawback of existing cable sleeves, as illustrated in FIGS. 3 and 4, an improved partitioned cable sleeve 44 is provided, wherein the opening of the channel 32 is reduced by adding an intermediate connection or boundary 46 along the strip(s) 30 of material forming the partitioned cable sleeve 44 between the upper edge 26 and lower edge 28 of the strip(s) so as to raise the bottom 48 of the channel 32 to a higher position that is closer to the elevation of the tension cable 16. In this manner, the upward movement of the soft top is significantly reduced due to the contact between the higher intermediate boundary 46 in the partitioned cable sleeve 44 and the tension cable 16. In its preferred form, the intermediate boundary 46 is created by stitching together or bonding of the strips 30 forming the cable sleeve along an intermediate line below the tension cable. Thus, as a result of this improved cable sleeve, the soft top is stretched and kept down, and the gap between the lower edge of the soft top and the soft top frame 14 is eliminated. Also, a desirable shingling effect is created by the increased overlap of the lower side edge 22 of the soft top over the weather seals 40 and the side door windows 38 on either side of the automobile.

The partitioned cable sleeve 44 also includes another improvement by incorporating an intermediate material that can bond or secure the cable sleeve 18 to the soft top 12 without the need for the direct stitching of the two together. As illustrated in FIG. 4, in its preferred embodiment, this is accomplished by adding a layer of adhesive film 50 between the partitioned cable sleeve 44 and the interior surface 20 of the soft top 12 and bonding the cable sleeve to the soft top by R.F. (Radio Frequency) welding. It is to understood that while one could use stitching, R.F. welding, strong adhesives or other suitable welding or bonding or attachment methods could instead be used to secure the cable sleeve to the soft top, as well as to secure the multiple strips of material 30 that form the cable sleeve, avoiding stitching altogether. The addition of the intermediate layer to secure the cable sleeve to the interior of the soft top also has the added advantage that the two are secured together along the entire surface area of the cable sleeve, not just along two lines, which helps prevent the soft top and the cable sleeve from becoming separated.

Thus, the improved partitioned cable sleeve of the present invention enhances the appearance of the soft top by stretching the soft top further downward and reducing its upward movement and shrinkage, eliminates undesirable gaps between the soft top and the soft top frame and weather seals to create a better seal and reduce wind noise, provides for an improved shingling of the soft top in relation to the weather seal and the side door window. The improved cable sleeve of the invention also avoids the holes created by the direct stitching of the cable sleeve to the soft top, thereby improving the appearance of the soft top and eliminating a source of water and moisture leakage.

A variety of further modifications and improvements in and to the invention will be apparent to persons skilled in the art. Accordingly, no limitation on the invention is intended by way of the foregoing description and accompanying drawings, except as set forth in the appended claims.

What is claimed is:

1. An improved automobile convertible top of the type having a convertible top frame, a tension cable attached to said top frame, a soft top with a lower side edge attached to said top frame, a cable sleeve with a channel formed therein and attached to an interior surface of said soft top so that said channel extends generally along a portion of said lower side edge, said tension cable extending through said channel, and said channel having an upper boundary located above said tension cable and a lower boundary located below said tension cable, wherein the improvement comprises:

an intermediate boundary in said cable sleeve positioned below said tension cable, and engaging said tension cable to prohibit said lower edge of said soft top from rising up and separating from said top frame, whereby said lower edge of said soft top is retained substantially in engagement with said top frame.

2. The improved automobile convertible top of claim 1 wherein said soft top is retained substantially in engagement with a weather seal positioned along a substantial portion of said top frame.

3. An automobile convertible top comprising:

a convertible top frame;

a tension cable attached to said top frame;

a soft top with a lower side edge attached to said top frame;

a cable sleeve with a channel formed therein and attached to an interior surface of said soft top so that said channel extends generally along a portion of said lower side edge, said tension cable extending through said channel; and said channel having an upper boundary located above said tension cable, a lower boundary located below said tension cable, and an intermediate boundary in said cable sleeve positioned below said tension cable and engaging said tension cable to prohibit said lower edge of said soft top from rising up and separating from said top frame, whereby said lower edge of said soft top is retained substantially in engagement with said top frame.

4. The automobile convertible top of claim 3 wherein said soft top is retained substantially in engagement with a weather seal positioned along a substantial portion of said top frame.

5. An automobile convertible top comprising:

a convertible top frame;

a tension cable attached to said top frame;

a soft top with a lower side edge attached to said top frame;

a cable sleeve with a channel formed therein and attached to an interior surface of said soft top so that said channel extends generally along a portion of said lower side edge, said tension cable extending through said channel; and said channel having a first boundary located above said tension cable, and an second boundary in said cable sleeve positioned below said tension cable and engaging said tension cable to prohibit said lower edge of said soft top from rising up and separating from said top frame, whereby said lower edge of said soft top is retained substantially in engagement with said top frame.

6. The automobile convertible top of claim 5 wherein said soft top is retained substantially in engagement with a weather seal positioned along a substantial portion of said top frame.

* * * * *